United States Patent
Sarver

(10) Patent No.: US 11,307,068 B2
(45) Date of Patent: Apr. 19, 2022

(54) FLOW VALVE SYSTEM WITH ULTRASONIC FLOW SENSOR

(71) Applicant: Larry C. Sarver, Mars, PA (US)

(72) Inventor: Larry C. Sarver, Mars, PA (US)

( * ) Notice: Subject to any disclaimer, the term of this patent is extended or adjusted under 35 U.S.C. 154(b) by 341 days.

(21) Appl. No.: 16/660,971

(22) Filed: Oct. 23, 2019

(65) Prior Publication Data

US 2021/0123780 A1 Apr. 29, 2021

(51) Int. Cl.
 G01F 1/26 (2006.01)
 G01F 1/66 (2022.01)
 G01F 1/667 (2022.01)
 G05D 7/06 (2006.01)

(52) U.S. Cl.
 CPC ............... G01F 1/26 (2013.01); G01F 1/662 (2013.01); G01F 1/667 (2013.01); G05D 7/0629 (2013.01)

(58) Field of Classification Search
 None
 See application file for complete search history.

(56) References Cited

U.S. PATENT DOCUMENTS

| 3,559,482 A * | 2/1971 | Baker ................. G01F 5/00 73/202.5 |
| 5,297,426 A * | 3/1994 | Kane .................. G01F 5/00 73/202 |
| 5,333,496 A * | 8/1994 | Fenelon ............... G01F 5/00 73/202 |
| 5,861,561 A * | 1/1999 | Van Cleve ........... G01F 1/8404 73/861.52 |
| 2009/0007654 A1* | 1/2009 | Niikawa .............. G01F 1/6842 73/202 |
| 2009/0025472 A1* | 1/2009 | Garvin ................. G01F 5/00 73/202 |

OTHER PUBLICATIONS

Great Plains Industries, Inc., "Flomec QS200 Insertion Ultrasonic Flowmeter" Product Owner's Manual, 2018, pp. 1-24, Great Plains Industries, Inc., Wichita, Kansas.
Wikipedia, "Ultrasonic flow meter", https://en.wikipedia.org/wiki/Ultrasonic_flow_meter, Printed Sep. 8, 2019, pp. 1-3.

* cited by examiner

*Primary Examiner* — Harshad R Patel
(74) *Attorney, Agent, or Firm* — The Webb Law Firm

(57) ABSTRACT

A flow system includes a flow sensor, a first pipe configured to transport fluid from an upstream fluid source to the flow sensor, and a second pipe configured to transport fluid from the flow sensor to a downstream fluid distributor. Proximate the flow sensor, the first pipe has a first interior diameter and the second pipe has a second interior diameter. The flow system further includes at least one of the following: a flow diversion or flow obstruction positioned between the flow sensor and the upstream fluid source a distance or length from the flow sensor that is less than ten times the first interior diameter of the first pipe and/or a flow diversion or flow obstruction positioned between the flow sensor and the downstream fluid distributor a distance or length from the flow sensor that is less than five times the second interior diameter of the second pipe.

16 Claims, 3 Drawing Sheets

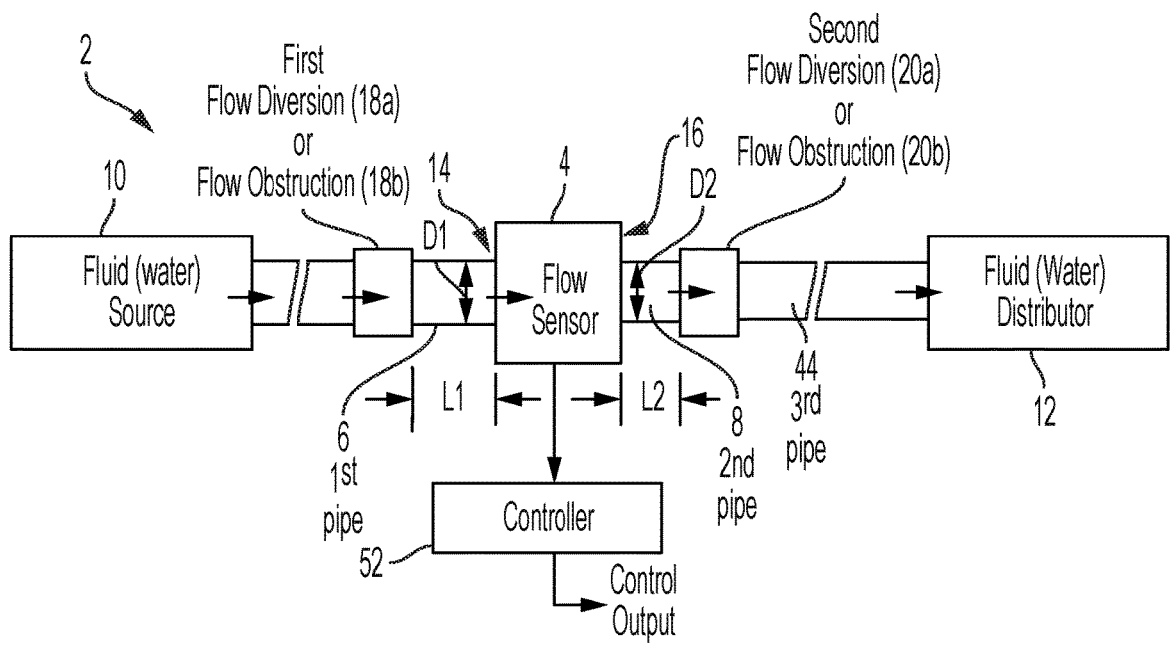
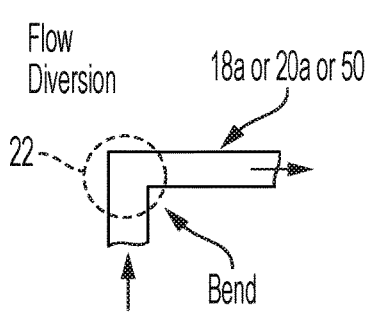 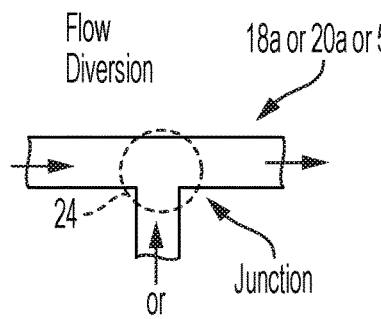 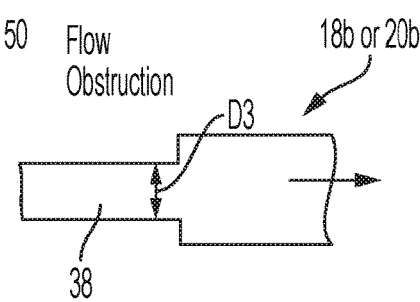
FIG. 2    FIG. 3    FIG. 4
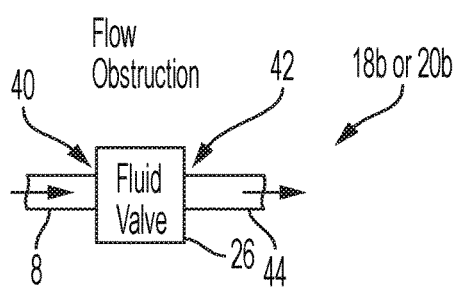
FIG. 5

FLOW VALVE SYSTEM WITH ULTRASONIC FLOW SENSOR

BACKGROUND OF THE INVENTION

Field of the Invention

The present invention relates to a flow system, in particular, a flow control system for controlling irrigation of one or more desired areas.

Description of Related Art

Heretofore, flow sensors for measuring velocity of fluid flowing in pipes of irrigation systems were required to have an upstream flow diversion or flow obstruction (if provided) at least ten pipe diameters away from the flow sensor and/or a downstream flow diversion or flow obstruction (if provided) at least five pipe diameters from the flow sensor. As is known in the art, such flow sensors convert the measured fluid velocity into a corresponding electrical signal that can be used by a processor based controller, in a manner known in the art, to determine a volume of fluid flowing by or through the fluid sensor over a period of time.

As best understood, these distances (namely, at least ten pipe diameters upstream and at least five pipe diameters downstream) were needed to avoid turbulence in the fluid flowing by or through the flow sensor from adversely affecting the flow sensor's ability to provide an accurate indication of the fluid velocity measured by the flow sensor.

However, there is a desire in the industry to provide flow systems or flow control systems that are more compact than current state of the art flow systems.

SUMMARY OF THE INVENTION

Generally, provided, in some non-limiting embodiments or examples, is a flow system (sometimes referred to as a "flow control system") that can, for example, be used as part of an irrigation system to control the distribution of water to an area.

Further non-limiting embodiments or examples are set forth in the following numbered clauses.

Clause 1: A flow system comprises a flow sensor connected via a plurality of fluid delivery pipes between a fluid source and a fluid distributor. The plurality of fluid delivery pipes includes a first pipe connected between the fluid source and an inlet to the flow sensor and a second pipe connected between an outlet of the flow sensor and the fluid distributor. Proximate the inlet of the flow sensor, the first pipe has a first interior diameter and, proximate the outlet of the flow sensor, the second pipe has a second interior diameter. The flow system comprises at least one of the following: a distance or length L1 between the inlet of the flow sensor and a flow diversion or a flow obstruction in the fluid path of the first pipe leading to the inlet of the flow sensor is less than ten times the first interior diameter; and/or a distance or length L2 between the outlet of the flow sensor and a flow diversion or a flow obstruction in the fluid path of the second pipe exiting the flow sensor is less than five times the second interior diameter.

Clause 2: The flow system of clause 1, wherein the first and second interior diameters can be the same or different.

Clause 3: The flow system of clause 1 or 2, wherein the flow diversion in at least one of the first pipe and the second pipe can include: a bend in said pipe, or a junction of three portions of said pipe.

Clause 4: The flow system of any one of clauses 1-3, wherein the bend can be a right angle.

Clause 5: The flow system of any one of clauses 1-4, wherein the junction can be T-shaped.

Clause 6: The flow system of any one of clause 1-5, wherein the flow obstruction in the fluid path of at least one of the first pipe and the second pipe can be a fluid valve or another pipe having an interior diameter that is less than the respective first interior diameter and second interior diameter.

Clause 7: The flow system of any one of clause 1-6, wherein the flow obstruction in the fluid path of the second pipe exiting the flow sensor can be a fluid valve having an inlet connected to the second pipe opposite the flow sensor and an outlet connected to the fluid distributor via a third pipe.

Clause 8: The flow system of any one of clause 1-7, wherein the flow diversion in the fluid path of the second pipe can include a junction between an inlet of the second pipe that can be connected to an outlet of the flow sensor, a first outlet connected to an inlet of a fluid valve, and a second outlet. The third pipe can include a flow diversion in the fluid path of the third pipe in the form of a junction between a first inlet of the third pipe connected to an outlet of the fluid valve, a first outlet connected to the fluid distributor, and a second inlet. A shunt pipe can be connected in parallel with the fluid valve between the second outlet of the second pipe and the second inlet of the third pipe. A valve and a hydrogenerator can be mounted to the shunt pipe such that fluid flowing from the second pipe to the third pipe via the shunt pipe flows through the valve and the hydrogenerator, the hydrogenerator generating electrical power in response to the fluid flowing through the hydrogenerator.

Clause 9: The flow system of any one of clause 1-8, wherein the flow sensor can be an ultrasonic flow sensor.

Clause 10: The flow system of any one of clause 1-9, wherein the ultrasonic flow sensor can be a time transit flow meter.

Clause 11: The flow system of any one of clause 1-10, wherein: the flow sensor can be programmed or configured to output to a controller an electrical signal related to a velocity or volume of fluid flowing by, proximate to, or through the flow sensor; and the controller can be programmed or configured to determine, based on the electrical signal, an actual volume of fluid flowing by, proximate to, or through the flow sensor.

Clause 12: The flow system of any one of clause 1-11, wherein the controller can comprise a first processor programmed or configured: with a calibration value related to the distance or length L1, or the distance or length L2, or a type, style, or configuration of the flow diversion or the flow obstruction in the first pipe, or a type, style, or configuration of the flow diversion or the flow obstruction in the second pipe, or some combination thereof; and to determine, based on the electrical signal and the calibration value, a second electrical signal related to an actual velocity or volume of the fluid flowing by, proximate to, or through the flow sensor, wherein the electrical signal and the second electrical signal are different.

Clause 13: The flow system of any one of clause 1-12, wherein the controller can comprise a second processor programmed or configured to determine, based on the second electrical signal, the actual volume of fluid flowing by, proximate to, or through the flow sensor.

Clause 14: The flow system of any one of clause 1-13, wherein the second processor can be programmed or configured to control the open and closed state of a fluid valve based on the actual volume of fluid determined by the second processor to be flowing by, proximate to, or through the flow sensor.

Clause 15: The flow system of any one of clause 1-14, wherein: the electrical signal can include data modulated thereon related to the velocity or volume of the fluid flowing by, proximate to, or through the flow sensor; the second electrical signal can include corrected data modulated thereon related to the actual velocity or volume of fluid flowing by, proximate to, or through the flow sensor; and the second processor can be programmed or configured to control the open and closed state of a fluid valve based on the corrected data, wherein the data modulated on the electrical signal can be inaccurate for the actual volume of fluid flowing by, proximate to, or through the flow sensor.

Clause 16: The flow system of any one of clause 1-15, wherein the controller can be programmed or configured with an algorithm that includes a calibration value related to the distance or length L1; or the distance or length L2; or a type, style, or configuration of the first flow diversion or the first flow obstruction; or a type, style, or configuration of the second flow diversion or the second flow obstruction; or some combination thereof; and the controller can determine, based on said programmed calibration value, the volume of fluid flowing by, proximate to, or through the flow sensor.

Clause 17: A flow system comprises a flow sensor, a first pipe configured to transport fluid from an upstream fluid source to the flow sensor, and a second pipe configured to transport fluid from the flow sensor to a downstream fluid distributor. Proximate the flow sensor, the first pipe has a first interior diameter and the second pipe has a second interior diameter. The flow system comprises at least one of the following: a flow diversion or a flow obstruction positioned between the flow sensor and the upstream fluid source a distance or length L1 from the flow sensor that is less than ten times the first interior diameter of the first pipe; and a flow diversion or a flow obstruction positioned between the flow sensor and the downstream fluid distributor a distance or length L2 from the flow sensor that is less than five times the second interior diameter of the second pipe.

Clause 18: The flow system of clause 17, wherein: the flow sensor can be programmed or configured to output to a controller an electrical signal related to a velocity or volume of fluid flowing by, proximate to, or through the flow sensor; and the controller can be programmed or configured to determine, based on the electrical signal, an actual volume of fluid flowing by, proximate to, or through the flow sensor.

Clause 19: The flow system of clause 17 or 18, wherein the controller can comprise a first processor programmed or configured: with a calibration value related to the distance or length L1, or the distance or length L2, or a type, style, or configuration of the flow diversion or the flow obstruction in the first pipe, or a type, style, or configuration of the flow diversion or the flow obstruction in the second pipe, or some combination thereof; and to determine, based on the electrical signal and the calibration value, a second electrical signal related to an actual velocity or volume of the fluid flowing by, proximate to, or through the flow sensor, wherein the electrical signal and the second electrical signal are different.

Clause 20: The flow system of any one of clauses 17-19, wherein the controller can comprise a second processor programmed or configured to determine, based on the second electrical signal, the actual volume of fluid flowing by, proximate to, or through the flow sensor.

Clause 21: The flow system of any one of clauses 17-20, wherein the second processor can be programmed or configured to control the open and closed state of a fluid valve based on the actual volume of fluid determined by the second processor to be flowing by, proximate to, or through the flow sensor.

Clause 22: The flow system of any one of clauses 17-21, wherein: the electrical signal can include data modulated thereon related to the velocity or volume of the fluid flowing by, proximate to, or through the flow sensor; the second electrical signal can include corrected data modulated thereon related to the actual velocity or volume of fluid flowing by, proximate to, or through the flow sensor; and the second processor can be programmed or configured to control the open and closed state of a fluid valve based on the corrected data, wherein the data modulated on the electrical signal may be inaccurate for the actual volume of fluid flowing by, proximate to, or through the flow sensor.

Clause 23: The flow system of any one of clauses 17-22, wherein the controller can be programmed or configured with an algorithm that includes a calibration value related to the distance or length L1; the distance or length L2; or a type, style, or configuration of the first flow diversion or the first flow obstruction; or a type, style, or configuration of the second flow diversion or the second flow obstruction; or some combination thereof; and the controller can determine, based on said programmed calibration value, the volume of fluid flowing by, proximate to, or through the flow sensor.

Clause 24: The flow system of any one of clauses 17-23, wherein the type, style, or configuration of at least one of the first flow diversion or the second flow diversion can be a bend or a junction.

Clause 25: The flow system of any one of clauses 17-24, wherein the bend can be a right angle and/or the junction can be T-shaped.

Clause 26: The flow system of any one of clauses 17-25, wherein the type, style, or configuration of at least one of the first flow obstruction and the second flow obstruction can be a valve or another pipe having an interior diameter that can be less than the respective first interior diameter of the first pipe and the second interior diameter of the second pipe.

Clause 27: The flow system of any one of clauses 17-26, wherein the first interior diameter and the second interior diameter can be the same or different

BRIEF DESCRIPTION OF THE DRAWINGS

These and other features of the present invention will become more apparent from the following description wherein reference is made to the appended drawings wherein:

FIG. 1 is a schematic view of a non-limiting embodiment or example flow system according to the principles of the present invention;

FIGS. 2-3 are examples of different types of flow diversions that can be used with the flow systems disclosed herein;

FIGS. 4-5 are examples of different types of flow obstructions that can be used with the flow systems disclosed herein;

DESCRIPTION OF THE INVENTION

Figure 6:
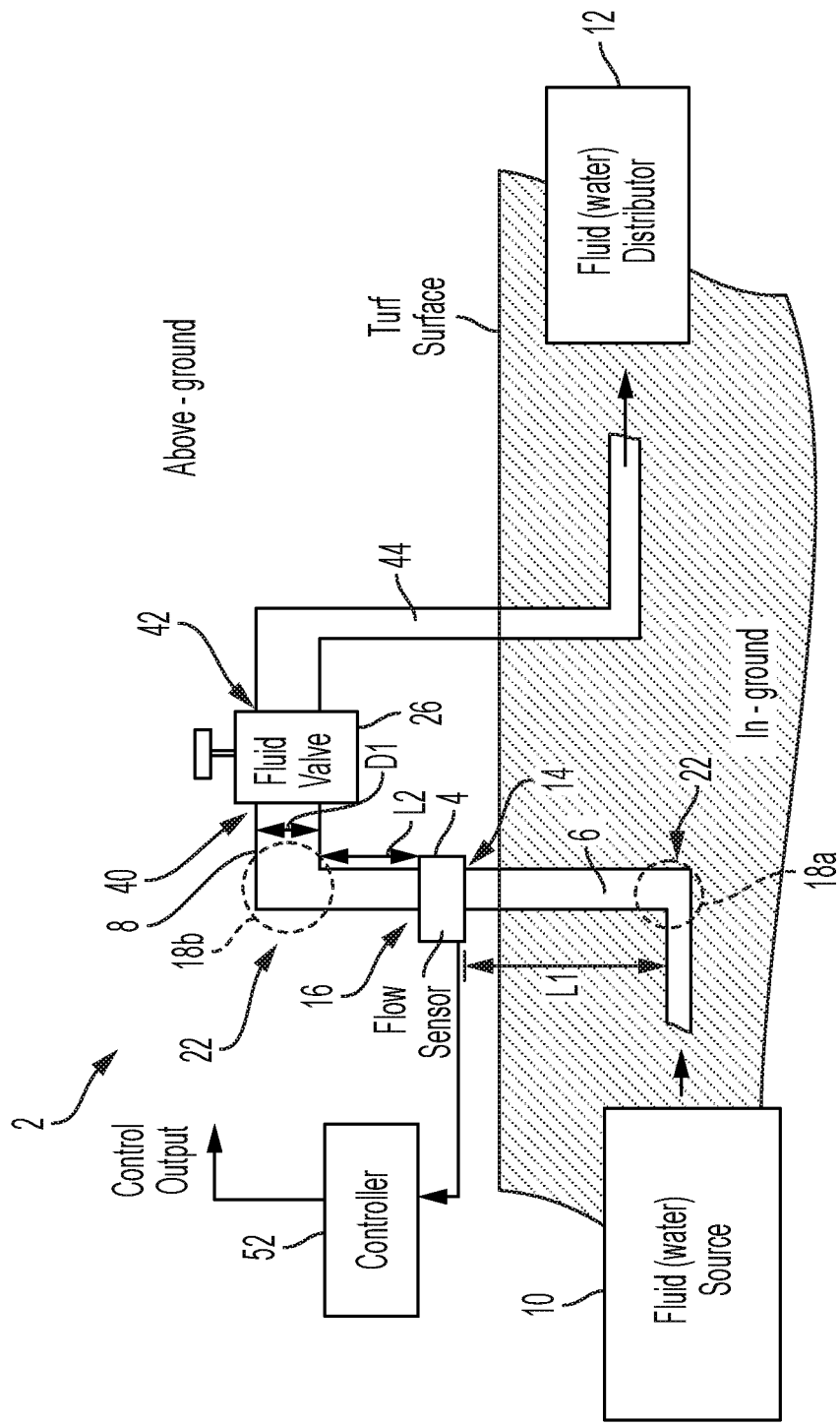
FIG. 6 is a schematic view of another non-limiting embodiment or example flow system according to the principles of the present invention.

The following examples will be described with reference to the accompanying figures where like reference numbers correspond to like or functionally equivalent elements. It is to be understood that the specific example(s) illustrated in the attached drawings, and described in the following specification, are simply non-limiting embodiments or examples of the invention. Hence, the specific embodiments or examples disclosed herein are not to be construed as limiting.

With reference to FIG. 1, in some non-limiting embodiments or examples, a flow system 2 includes a flow sensor 4 connected via a plurality of fluid delivery pipes (6, 8) between a fluid source 10 and a fluid distributor 12. The fluid distributor 12 can include any suitable and/or desirable water distribution means, such as, without limitation, a sprinkler head or a drip irrigation pipe.

In some non-limiting embodiments or examples, the plurality of fluid delivery pipes can include a first pipe 6 connected between the fluid source 10 and an inlet 14 to flow sensor 4 and a second pipe 8 connected between an outlet 16 of flow sensor 4 and fluid distributor 12. Proximate the inlet 14 of flow sensor 4, first pipe 6 has a first interior diameter D1. Proximate the outlet 16 of flow sensor 4, second pipe 8 has a second interior diameter D2. In an example, the first and second interior diameters (D1, D2) can be the same or different.

In some non-limiting embodiments or examples, flow sensor 4 can be an ultrasonic flow sensor. The ultrasonic flow sensor can, for example, be a transit time flow sensor. However, the description of flow sensor 4 being an ultrasonic flow sensor, in particular, a transit time flow sensor, is not to be construed in a liming sense.

The inventor has surprisingly discovered, contrary to the prior art known at the time of the present invention, that it is possible to successfully use in an irrigation system a flow sensor (e.g., an ultrasonic flow sensor and, in particular, a time transit ultrasonic flow sensor) that is positioned closer to flow diversion(s) and/or flow obstruction(s) than was previously thought possible to accurately measure a velocity of fluid flowing by, proximate, or through the flow sensor.

For example, in some non-limiting embodiments or examples, a distance or length L1 between inlet 14 of flow sensor 4 and a first flow diversion 18a or a first flow obstruction 18b in the fluid path of the first pipe 6 leading to inlet 14 of flow sensor 4 can be less than ten times the first interior diameter D1 of first pipe 6. Also or alternatively, in some non-limiting embodiments or examples, a distance or length L2 between outlet 16 of flow sensor 4 and a second flow diversion 20a or a second flow obstruction 20b in the fluid path of second pipe 8 exiting flow sensor 4 can be less than five times the second interior diameter D2 of second pipe. Herein, distance or length L1 is less than ten times the first interior diameter D1, and distance or length L2 is less than five times the second interior diameter D2.

Herein, terms such as "first", "second", "third", and the like are utilized for the purpose of description as an aid to distinguish one element or feature from another and are not to be construed in a limiting sense.

In some non-limiting embodiments or examples, flow system 2 can include first flow diversion 18a or first flow obstruction 18b within distance or length L1 of inlet 14 of flow sensor 4, but may not include a flow diversion 20a or flow obstruction 20b within distance or length L2 of outlet 16 of flow sensor 4. In another non-limiting embodiment or example, flow system 2 may include second flow diversion 20a or second flow obstruction 20b within distance or length L2 of outlet 16 of flow sensor 4, but may not include first flow diversion 18a or first flow obstruction 18b within distance or length L1 of input 14 of flow sensor 4. Accordingly, the description or illustration of inlet 14 of flow sensor 4 being within distance or length L1 of a flow diversion or flow obstruction and/or the outlet 16 of flow sensor 4 of being within distance or length L2 of a flow diversion or flow obstruction is not to be construed in a limiting sense since it is envisioned that flow system 2 may include a flow diversion or flow obstruction within distance or length L1 of input 14 of flow sensor 4, or a flow diversion of flow obstruction within distance or length L2 of outlet 16 of flow sensor 4, or both.

In some non-limiting embodiments or examples, first flow diversion 18a can include a bend 22 (FIG. 2) or a junction 24 (FIG. 3). Also or alternatively, in some non-limiting embodiments or examples, second flow diversion 20a can include a bend 22 or a junction 24. Also or alternatively, in some non-limiting embodiments or examples, a third junction (FIG. 7, described hereinafter) can include a bend 22 or junction 24. In an example, each bend 22 can be a right angle or any other desirable angle <180°. In another example, each junction 24 can be T-shaped having three ports. However, junctions having other shapes including three or more ports is envisioned.

In some non-limiting embodiments or examples, first flow obstruction 18b can be a fluid valve 26 (FIG. 5) or another pipe 38 (FIG. 4) having an interior diameter D3 that is less than the first interior diameter D1. Also or alternatively, second flow obstruction 20b can be a fluid valve 26 or another pipe 38. In some non-limiting embodiments or examples, first flow obstruction 18b can be part of a pipe, e.g., without limitation, first pipe 6, or can be coupled to said pipe. In some non-limiting embodiments or examples, second flow obstruction 20b can be part of a pipe, e.g., without limitation, second pipe 8 or can be coupled to said pipe.

With reference to FIG. 6 and with continuing reference to all previous figures, in some non-limiting embodiments or examples, first flow diversion 18a of first pipe 6 can be a bend 22 that is positioned length or distance L1 from inlet 14 of flow sensor 4 and second flow diversion 18b of second pipe 8 can be a bend 22 that is positioned distance or length L2 from outlet 16 of flow sensor 4. In this example, flow sensor 4, second pipe 8, a fluid valve 26 having an inlet 40 coupled to outlet 16 of flow sensor 4 via second pipe 8, a portion of first pipe 6, and a portion of third pipe 44 coupled to outlet 42 of fluid valve 26 are above-ground, while the remainder of first pipe 6 and third pipe 44 are in-ground. However, this is not to be construed in a limiting sense since it is envisioned that some or all of first pipe 6, flow sensor 2, second pipe 8, fluid valve 26, and/or third pipe 44 can be above-ground, in-ground, or some combination thereof.

Figure 7:
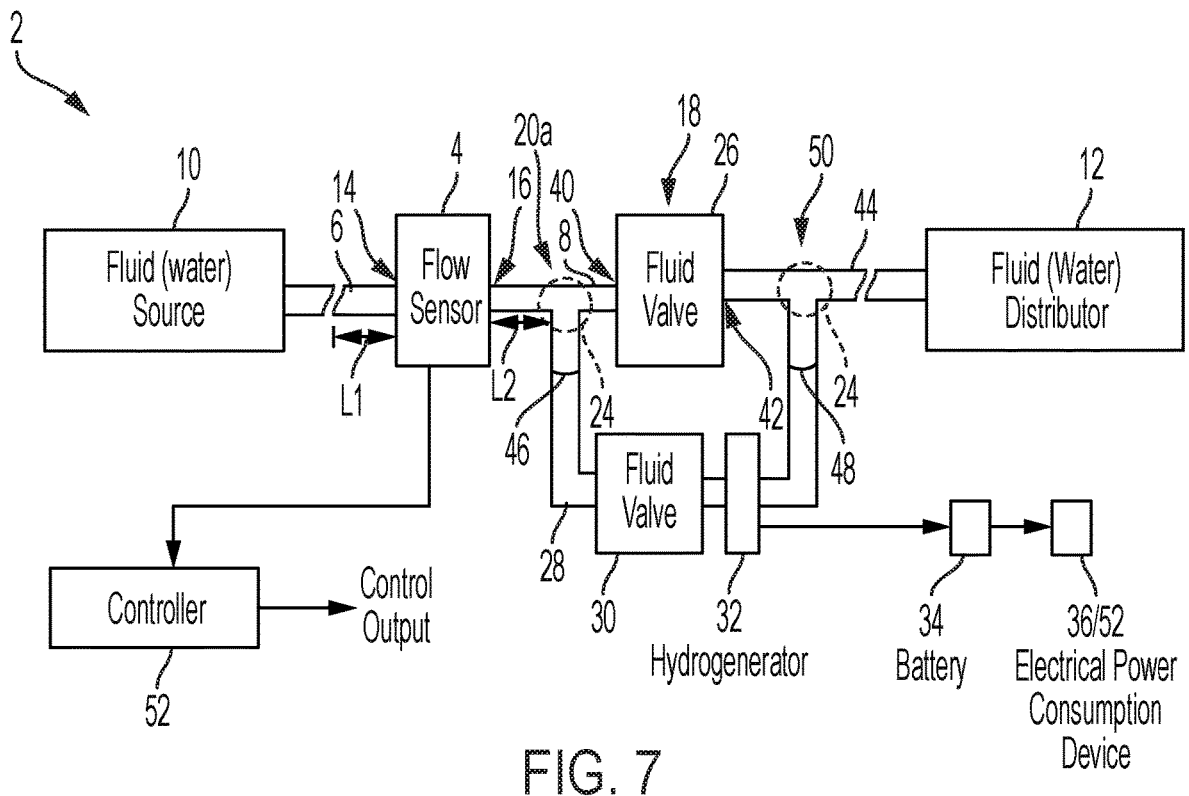
FIG. 7 is a schematic view of another non-limiting embodiment or example flow system according to the principles of the present invention.

With reference to FIG. 7 and with continuing reference to all previous figures, in some non-limiting embodiments or examples, second flow diversion 20a can include a junction 24, for example, a T-shaped junction, of second pipe 8 disposed between an inlet of second pipe 8 that is connected to outlet 16 of flow sensor 4, a first outlet of second pipe 8 connected to inlet 40 of a fluid valve 26, and a second outlet 46 of second pipe 8. In this example, a third flow diversion 50 can be provided that includes a junction 24 of third pipe 44 disposed between an inlet of third pipe 44 that is connected to outlet 42 of fluid valve 26, a first outlet of third pipe 44 connected (directly or indirectly) to fluid distributor 12, and a second inlet 48 of third pipe. In this example, the section of first pipe 6 leading to the inlet 14 of flow sensor 4 does not include a first flow diversion 18a or a first flow obstruction 18b within distance or length L1 of the inlet 14 of flow sensor 4. However, this is not to be construed in a limiting sense since it is envisioned that a first flow diversion 18a or a first flow obstruction 18b can, optionally, be positioned within distance or length L1 of the inlet 14 of flow sensor 4.

In some non-limiting embodiments or examples, a shunt pipe 28 can be connected in parallel with fluid valve 26 between second outlet 46 of second pipe 8 and second inlet 48 of third pipe 44. In an example, a fluid valve 30 and/or a hydrogenerator 32 can be mounted to shunt pipe 28 such that fluid flowing from second pipe 8 to third pipe 44 via shunt pipe 28 flows through fluid valve 30 and hydrogenerator 32. In an example, hydrogenerator 32 can generate electrical power in response to fluid flowing through hydrogenerator 32, which electrical power can be provided to a battery 34 for storage and use for powering an electrical power consumption device 36. In an example, the electrical power consumption device 36 can be a radio transmitter, a radio receiver, a radio transceiver, a processor based controller 52 that can be programmed or configured for controlling, via a control output of controller 52, the open and closed states of one or more fluid valves 26 and/or 30, and/or any other suitable and/or desirable electrical power consumption device that may not have access to electrical power from another source, such as a mains power source.

Heretofore, the prior art industry standard, practice, and understanding required that first pipe 6 have a straight run (without a diversion or an obstruction) of distance or length L1 that is at least ten times the first interior diameter D1 of first pipe 6 upstream of the inlet 14 of flow sensor 4, and a straight run (without a diversion or an obstruction) of distance or length L2 at least five times the second interior diameter D2 of second pipe 8 downstream of the outlet 16 of flow sensor 4. As best understood, these distances or lengths L1 and L2 avoid turbulence in the fluid, the velocity of which is being measured by flow sensor 4, which turbulence can adversely affect the measurement of the velocity (e.g., in feet per second) of fluid flowing by, proximate to, or through sensor 4. In contrast, the inventor has surprisingly discovered that it is possible to successfully use at least an ultrasonic flow sensor to measure fluid velocity when the inlet 14 of the ultrasonic flow sensor 4 is positioned a distance or length L1 that is less than ten times the interior diameter D1 of first pipe 6 to a flow diversion 18a or flow obstruction 18b. Similarly, the inventor has surprisingly discovered that it is also or alternatively possible to successfully use at least an ultrasonic flow sensor to measure fluid velocity when the outlet 16 of the ultrasonic flow sensor 4 is positioned a distance or length L2 that is less than five times the interior diameter D2 of the second pipe 8 to a flow diversion 20a or flow obstruction 20b.

In some non-limiting embodiments or examples, distance or length L1 can be less than five times, less than three times, or less than one time interior diameter D1. In some non-limiting embodiments or examples, distance or length L2 can be less than three times, or less than one time the interior diameter D2.

Because the distance or length L1 can be less ten times interior diameter D1 and/or because the distance or length L2 can be less five times interior diameter D2, the various example flow systems described herein can be made more compact and offer a wider variety of configuration options than was available in prior art flow systems.

In some non-limiting embodiments or examples, each example flow system described herein can include controller 52 that can be programmed or configured, in a manner known in the art, to process or measure, for each of one or more periods of time, the electrical signal output by flow sensor 4 related to the velocity or volume of the fluid flowing by, proximate to, or through the flow sensor 4, and to determine therefrom an actual volume of the fluid passing by, proximate to, or through the fluid sensor 4 during said period of time, e.g., integrate or sum the velocity or volume data modulated on the electrical signal with respect to the period of time. Based on the thus determined fluid volume, controller 52 can be programmed or configured to control the on/off state of one or more fluid valves thereby controlling the volume of fluid provided to an area being irrigated. In an example, controller 52 can include one or more processors and memory which can be programmed or configured to perform, at least, the various functions described herein. In an example, the electrical signal output by flow sensor 4 can be an analog signal or a digital signal that can include velocity or volume data modulated thereon and controller 52 can be programmed and/or configured to process said electrical signal in a manner known in the art to determine from said velocity or volume data modulated thereon a volume of fluid passing by, proximate to, or through the fluid sensor 4 during said period of time, e.g., integrate or sum the velocity or volume data with respect to the period of time.

In some non-limiting embodiments or examples, the electrical signal output by flow sensor 4 may be related to the velocity or volume of fluid flowing by, proximate to, or through the flow sensor 4. However, this is not to be construed in a limiting sense since it is envisioned that the electrical signal output by flow sensor 4 can be any suitable and/or desirable electrical signal, that can be processed by controller 52 to determine the actual volume of fluid flowing by, proximate to, or through the fluid sensor 4 during a period of time.

In some non-limiting embodiments or examples, controller 52 can be programmed or configured with an algorithm that determines, based on the data modulated on the electrical signal output by flow sensor 4, the actual volume of fluid passing by, proximate to, or through the fluid sensor 4 during a period of time. However, it has been observed that the distance or length L1 between the inlet 14 of the flow sensor 4 and a flow diversion 18a or a flow obstruction 18b in the fluid path of the first pipe 6 leading to the inlet 14 of flow sensor 4; or the distance or length L2 between the outlet 16 of the flow sensor 4 and a flow diversion 20a or a flow obstruction 20b in the fluid path of the second pipe 8 exiting flow sensor 4; or the type, style, or configuration of the first flow diversion or the first flow obstruction; or the type, style, or configuration of the second flow diversion or the second flow obstruction; or some combination thereof can affect (in a manner discussed hereinafter) the data that is modulated on the electrical signal output by the flow sensor 4 and, hence, the accuracy of the algorithm to determine the volume of fluid flowing by, proximate to, or through the flow sensor 4 during a period of time. Accordingly, in an example, the algorithm can include at least one calibration value, the value of which can be selected and programmed, configured, or preset in said algorithm to account for distance or length L1, or distance or length L2, or the type, style, or configuration of the first flow diversion or the first flow obstruction, or the type, style, or configuration of the second flow diversion or the second flow obstruction, or some combination thereof.

For example, in a first example configuration of flow system 2, flow diversion 18a or flow obstruction 18b is present; flow diversion 20a or flow obstruction 20b is not present; and distance L1 is, for example, five times interior diameter D1, the algorithm can be programmed with a first (calibration) value for this configuration of flow system 2. In a second example configuration of flow system 2 similar to the first example configuration of flow system 2 with the exception that either distance L1 is different from five times interior diameter D1 (but continues to be less than ten times interior diameter D1), e.g., three or seven times interior diameter D1, or the type, style, or configuration of flow diversion 18a or flow obstruction 18b is changed, the algorithm can be programmed with a second (calibration) value for this configuration of flow system 2.

In a third example configuration of flow system 2, flow diversion 20a or flow obstruction 20b is present; flow diversion 18a or flow obstruction 18b is not present; and distance L2 is, for example, three times interior diameter D2, the algorithm can be programmed with a third (calibration) value for this configuration of flow system 2. In a fourth example configuration of flow system 2 similar to the third example flow system 2 with the exception that distance L2 is different from three times interior diameter D2 (but continues to be less than five times interior diameter D2), e.g., one or two times interior diameter D2, or the type, style, or configuration of flow diversion 20a or flow obstruction 20b is changed, the algorithm can be programmed with fourth (calibration) value for this configuration of flow system 2.

In a fifth example configuration of flow system 2, flow diversion 20a or flow obstruction 20b is present; flow diversion 18a or flow obstruction 18b is present; distance L1 is, for example, five times interior diameter L1, and distance L2 is, for example, three times interior diameter D2, the algorithm can programmed with a fifth (calibration) value for this configuration of flow system 2. In a sixth example configuration of flow system 2 similar to the fifth example flow system 2 with the exception that one or both of distance(s) L1 and/or L2 is changed, e.g. greater than or less than the previous distance, (but L1 remains less than ten times diameter D1 and L2 remains less than 5 times diameter D2) and/or the type, style, or configuration of flow diversion 18a and/or 20a and/or the type, style, or configuration of flow obstruction 20b and/or 18b is changed, the algorithm can programmed with sixth (calibration) value for this configuration of flow system 2.

In a seventh example configuration of flow system 2 that does not include flow diversion 18a or flow obstruction 18b within ten times diameter of D1 and does not include flow diversion 20a or flow obstruction 20b within five times diameter of D2, the algorithm can programmed with seventh (calibration) value for this configuration of flow system 2. The various example configurations of flow system 2 described herein are strictly for the purpose of illustration and are not to be construed as limiting the invention.

In general, it is envisioned that, for each unique configuration of flow system 2, the algorithm will be programmed, configured, or preset with a unique calibration value for said configuration. However, this is not to be construed as limiting since it also possible that the same calibration value may be used for two or more unique configurations of flow system 2.

In some non-limiting embodiments or examples, it may be desirable to provide an integrated system that includes preconfigured flow system 2 together or in combination with controller 52 preprogrammed (or preset) with a predetermined calibration value for said preconfigured flow system 2 that enables the controller 52 to accurately determine the actual or true volume (±some tolerance) of fluid flowing by, proximate to, or through the flow sensor 4 during a period of time. For example, for any one of the configurations of the first—seventh example flow systems described above, controller 52 can preprogrammed with the corresponding one of the first—seventh calibration values related to said configuration of the flow system.

In an example, the calibration value for a particular configuration of flow system 2 can be determined by empirical testing or experimentation, e.g., by comparing a measured velocity or volume of fluid that flows by, proximate to, or through the flow meter 4 of said configuration of flow system 2 to a velocity or volume of fluid determined by controller 52 to flow by, proximate to, or through the flow meter 4 of said configuration of flow system 4, and adjusting (as needed) the value of the calibration value until the measured velocity or volume and the velocity or volume of fluid determined by controller 52 are the same or within a predetermined tolerance. In this way, regardless of its configuration, e.g., described herein or not described herein, preconfigured flow system 2 can be provided together with controller 52 preprogrammed (or preset) with the calibration value determined for said configuration of flow system 2 for installation without the need to determine, in-the-field, the calibration value that enables controller 52 to accurately determine the volume of fluid flowing by, proximate to, or through the flow sensor 4 during a period of time and to program controller 52, in-the-field, with said calibration value.

Figure 8:
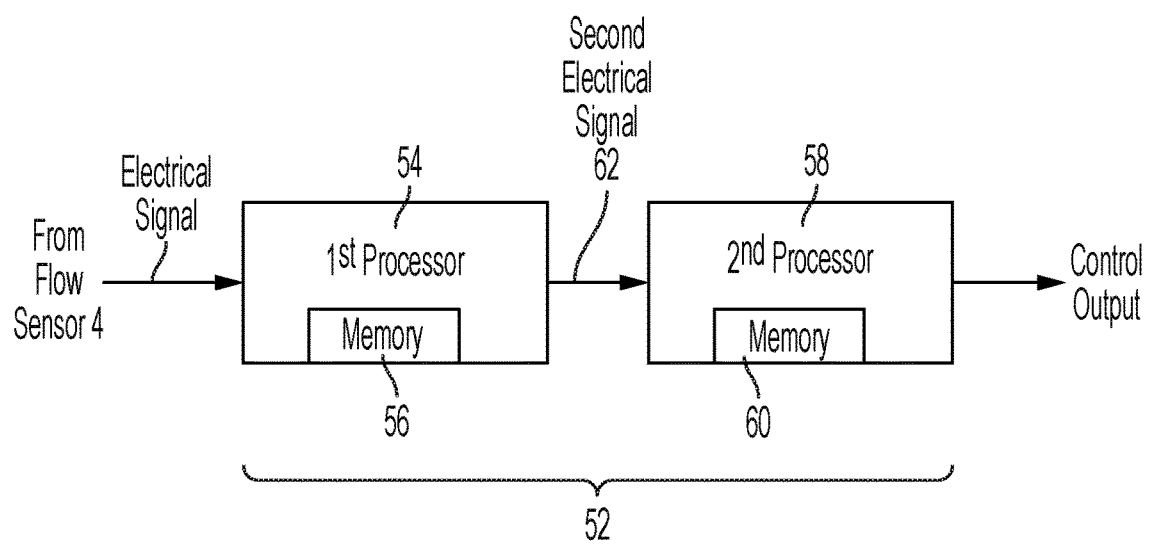
FIG. 8 is a block diagram of another example controller, including first and second processors or controllers, that can be used with any of the non-limiting embodiment or example flow systems described herein.

With reference to FIG. 8 and with continuing reference to FIGS. 1-7, in some non-limiting embodiments or examples, controller 52 can comprise a first processor or controller 54 and memory 56 that can programmed or configured with an algorithm preset with a calibration value related to the distance or length L1, or the distance or length L2, or a type, style, or configuration of the first flow diversion or the first flow obstruction 18a or 18b, or a type, style, or configuration of the second flow diversion or the second flow obstruction 20a and 20b, or some combination thereof. In an example, when executed or run, the algorithm preset with said calibration value can determine and output, based on the data modulated on the electrical signal received by first processor or controller 54 from flow sensor 4 related to the volume of fluid flowing by, proximate to, or through the flow sensor, a second electrical signal related to the actual velocity or volume of volume of fluid flowing by, proximate to, or through the flow sensor. In this example, the data modulated on the electrical signal output by the flow sensor 4 is inaccurate (for reasons discussed hereinafter) for the actual velocity of the volume of fluid flowing by, proximate to, or through the flow sensor 4. Herein, flow sensor 4 may sometimes be referred to as a flow meter.

In some non-limiting embodiments or examples, controller 52 may also comprise a second processor or controller 58 and related memory 60 programmed or configured to determine, based on the second electrical signal received from the first processor or controller 54 via a communication means 62, the actual volume of fluid flowing by, proximate to, or through the flow sensor during a period of time. In some non-limiting embodiments or examples, communication means 62 may be a wired connection, a wireless connection, or some combination of a wired and wireless connection that communicatively connects first processor or controller 54 and second processor or controller 58, which may be separated from each other by a distance. In some non-limiting embodiments or examples, for reasons discussed hereafter, the integrated system may include preconfigured flow system 2 together or in combination only with first processor or controller 54, but not second processor or controller 58.

In some non-limiting embodiments or examples, second processor or controller 58 may be a conventional irrigation controller that is programmed or configured to work directly with the data modulated on the electrical output of flow sensor 4 when the inlet 14 of flow sensor 4 is positioned greater than distance or length L1 from a first flow diversion 18*a* or first flow obstruction 18*b*, or the outlet 16 of flow sensor 4 is positioned greater than distance or length L2 from a second flow diversion 20*a* or second flow obstruction 20*b*, or both, whereupon the data modulated on the electrical output of the flow sensor 4 is accurate for the volume of fluid flowing by, proximate to, or through the flow sensor 4. However, when the inlet 14 of flow sensor 4 is positioned distance or length L1 (less than ten times diameter D1) from a first flow diversion 18*a* or first flow obstruction 18*b*, or the outlet 16 of flow sensor 4 is positioned distance or length L2 (less than five times diameter D2) from a second flow diversion 20*a* or second flow obstruction 20*b*, or both, the data modulated on the electrical signal output by the flow sensor 4 may be inaccurate for the actual velocity or volume of fluid flowing by, proximate to, or through the flow sensor, e.g., due to turbulence in the fluid being measured by flow sensor 4.

To account for this potential inaccuracy, the first processor or controller 54 can be provided that is programmed or configured with a suitable algorithm programmed or preset with a predetermined calibration value to convert the inaccurate data modulated on the electrical output by flow sensor 4 to corrected (or accurate) data modulated on the second electrical signal that can be output to and used by the second processor or controller 58, e.g., in the nature of a conventional irrigation controller, to accurately determine the volume of fluid flowing by, proximate to, or through the flow sensor 4. That is, the first processor or controller 54 can be programed or configured to convert the data modulated on the electrical output the flow sensor 4 that is inaccurate for the actual velocity or volume of fluid actually flowing by, proximate to, or through the flow sensor 4 into corrected data that is modulated on the second electrical signal, which corrected data is different than the inaccurate data and is accurate for the actual velocity or volume of fluid actually flowing by, proximate to, or through the flow sensor 4, which second electrical signal can be provided to the second processor or controller 58, e.g., in the nature of a conventional irrigation controller, which can be programmed or configured to control the volume of fluid provided to an area being irrigated based on the corrected data. Of course, it is envisioned that the functions described above for first processor or controller 54 and second processor or controller 58 can be incorporated into and performed by a single controller, e.g., controller 52.

In one non-limiting embodiment or example, assume that when flow sensor 4 is positioned greater than distance L1 from a first flow diversion or flow obstruction, greater than distance L2 from a second flow diversion or flow obstruction, or both, the data modulated on the electrical signal output by flow sensor 4 can include, for example, one electrical pulse for every single gallon of fluid flowing by, proximate to, or through the flow sensor 4, i.e., flow sensor 4 is programmed of configured to output one electrical pulse for every single gallon of fluid flowing by, proximate to, or through the flow sensor 4. In this example, the electrical signal output by flow sensor 4 can be provided directly to a conventional irrigation controller, e.g., second processor or controller 58, which can be programmed or configured to interpret each electrical pulse output by flow sensor 4 as corresponding to one gallon of fluid flowing by, proximate to, or through the flow sensor 4, and can control the open/closed state of at least one fluid valve to control the volume of fluid (water) provided to an area being irrigated based on a count of the electrical pulses output by flow sensor 4 over a period of time.

Now, assume, for example, that when positioned distance L1 (less than 10 times distance D1) from the first flow diversion or flow obstruction, distance L2 (less than 5 times distance D2) from the second flow diversion or flow obstruction, or both, the data modulated on the electrical signal output by flow sensor 4 includes, in an example, one electrical pulse for every two gallons of fluid (or ½ gallon of fluid) sensed by flow sensor 4 flowing by, proximate to, or through the flow sensor 4, i.e., the data modulated on the electrical signal is inaccurate for the actual or true volume of fluid (±some tolerance) flowing by, proximate to, or through the flow sensor 4. In this scenario, if the data modulated on the electrical signal output by flow sensor 4 is provided directly to the conventional irrigation controller, e.g., second processor or controller 58, that is programmed or configured to interpret each electrical pulse output by flow sensor 4 as corresponding to one gallon of fluid flowing by, proximate to, or through the flow sensor 4, the open/closed state of the at least one fluid valve will be controlled based on an inaccurate determination of the actual volume of fluid flowing by, proximate to, or through the flow sensor 4. Herein, the determined actual volume of fluid flowing by, proximate to, or through the flow sensor 4 may include said actual volume ±2% or ±1% or ±½%.

To avoid such inaccurate determination, first processor or controller 54 can be provided between flow sensor 4 and second processor or controller 58. First processor or controller 54 can be programmed or configured with an algorithm preprogrammed or preset with a calibration value, that when executed converts the inaccurate data modulated on the electrical signal output by flow sensor 4, e.g., one electrical pulse for every two gallons of fluid (or ½ gallon of fluid) sensed by flow sensor 4, into corrected data modulated on the second electrical signal, e.g., one electrical pulse for every one gallon of fluid actually flowing by, proximate to, or through the flow sensor 4. This corrected data modulated on the second electrical signal can be provided to the conventional irrigation controller, e.g., second processor or controller 58, which can control the open/closed state of the at least one fluid valve to control the volume of fluid (water) provided to the area being irrigated based on the corrected data.

The description herein of the data modulated on the electrical signal output by flow sensor 4 and the corrected data modulated on the second electrical signal output by first processor or controller 54 being electrical pulses which are counted is not to be construed in a limiting sense since it is envisioned that one or both of these electrical signals may be analog signals and/or digital signals, the pulse width(s) of the latter of which may correspond to a volume of velocity determined by fluid sensor to be flowing by, proximate to, or through flow sensor 4. Moreover, in the above examples, the volume of fluid associated with each electrical pulse, e.g., ½, one or two gallons per electrical pulse, is strictly for the purpose of illustration and is not to be construed in a limiting sense.

As can be understood from the foregoing, in some non-limiting embodiments or examples, a flow system in accordance with the principles of the present invention may be provided with flow sensor 4 positioned distance L1 (less than ten times diameter D1) from a first flow diversion or flow obstruction, distance L2 (less than five times diameter D2) from a second flow diversion or flow obstruction, or both in combination with first processor or controller 54 programmed or configured to convert the inaccurate electrical signal (having inaccurate data modulated thereon) output by flow sensor 4 into the second (accurate) electrical signal (having corrected data modulated thereon) that can be used by second processor or controller 58 to accurately control the volume of fluid flowing by, proximate to, or through the flow sensor 4.

In an example, this flow system may be provided without the second processor or controller 58. An advantage of this flow system (without the second processor or controller 58) is that it may be used with a conventional irrigation controller without the need to provide the conventional irrigation controller with the flow system, whereupon the end user may use any conventional irrigation controller available from of any number of suppliers. However, this is not to be construed in a limiting sense since it is envisioned, in another example, that the flow system may be provided with a conventional irrigation controller, e.g., the second processor or controller 58.

In some non-limiting embodiments or examples, a flow system in accordance with the principles of the present invention can include flow sensor 4 positioned distance L1 (less than ten times diameter D1) from a first flow diversion or flow obstruction, distance L2 (less than five times diameter D2) from a second flow diversion or flow obstruction, or both in combination with a single controller 52 which can be programmed or configured to integrate and perform the functions of first processor or controller 54 and second processor or controller 58 without the need for communication means 62 to connect first processor or controller 54 and second processor or controller 58.

FIGS. 1, 6, and 7 show non-limiting embodiments or examples of flow systems 2 including example elements or features. However, it is to be appreciated that each of these flow systems 2 may exclude one or more the illustrated example elements or features or may include additional or alternative elements or features not shown but presently known in the art or hereinafter developed. Accordingly, the flow systems shown in FIGS. 1, 6, and 7 and the descriptions thereof herein are not to be construed in a limiting sense.

As can be seen, disclosed herein, in some non-limiting embodiments or examples, e.g., as shown generically in FIG. 1, is a flow system 2 that includes a flow sensor 4 connected via a plurality of fluid delivery pipes (6, 8) between a fluid source 10 and a fluid distributor 12. The plurality of fluid delivery pipes can include a first pipe 6 connected between the fluid source 10 and an inlet 14 to the flow sensor 4 and can include a second pipe 8 connected between an outlet 16 of the flow sensor 4 and the fluid distributor 16. Proximate the inlet 14 of the flow sensor 4, the first pipe 6 has a first interior diameter D1. Proximate the outlet 16 of the flow sensor 4, the second pipe 8 has a second interior diameter D2.

The distance or length L1 between the inlet 14 of the flow sensor 4 and a flow diversion 18*a* or a flow obstruction 18*b* in the fluid path of the first pipe 6 leading to the inlet 14 of the flow sensor 4 is less than ten times the first interior diameter D1. Also or alternatively, a distance or length L2 between the outlet 16 of the flow sensor and a flow diversion 20*a* or a flow obstruction 20*b* in the fluid path of the second pipe 8 exiting the flow sensor 4 is less than five times the second interior diameter D2. Flow system 2 may include flow diversion 18*a* or flow obstruction 18*b* and not include flow diversion 20*a* or flow obstruction 20*b*, or vice versa.

In some non-limiting embodiments or examples, the first and second interior diameters (D1, D2) can be the same or different.

In some non-limiting embodiments or examples, the flow diversion (18*a*, 20*a*) of at least one of the first pipe 6 and the second pipe 8 can include: a bend 22 (FIG. 2) in said pipe or a junction 24 (FIG. 3) of at least three portions or sections of said pipe. In an example, the bend 22 can be a right angle or an angle <180°. In an example, the junction 24 can be T-shaped or any other shape having three or more ports (inlet(s) or outlet(s)).

In some non-limiting embodiments or examples, the flow obstruction (18*b*, 20*b*) associated with at least one of the first pipe 6 and the second pipe 8 can be a fluid valve 26 (FIG. 5) or another pipe 38 having an interior diameter D3 (FIG. 4) that is less than the first interior diameter D1 and/or the second interior diameter D2.

In some non-limiting embodiments or examples, e.g., as shown in FIG. 6, the flow diversion 18*b* in the second pipe 8 can be a bend 22. The diversion 18*a* of the first pipe can also or alternatively be a bend 22

In some non-limiting embodiments or examples, e.g., as shown in FIG. 7, the flow diversion 20*a* of the second pipe 8 can be a junction 24 between an inlet of the second pipe 8 that is connected to an outlet 16 of the flow sensor 4, a first outlet of the second pipe 8 connected to an inlet 40 of a fluid valve 26, and a second outlet 46 of the second fluid pipe 8. A third pipe 44 can include a flow diversion 50 in the form of a junction 24 between a first inlet of third pipe 44 connected to an outlet 42 of the fluid valve 26, a first outlet of the third pipe 44 connected (directly or indirectly) to the fluid distributor 12, and a second inlet 48 of the third pipe 44. A shunt pipe 28 can be connected in parallel with the fluid valve 26 between the second outlet 46 of the second pipe 8 and the second inlet 48 of the third pipe 44. A fluid valve 30 and/or a hydrogenerator 32 can be mounted to the shunt pipe 28 such that fluid flowing from the second pipe 8 to the third pipe 44 via the shunt pipe 28 flows therethrough. The hydrogenerator 32 can generate electrical power in response to the fluid flowing through the hydrogenerator 32.

In some non-limiting embodiments or examples, the flow sensor 4 can be is an ultrasonic flow sensor, in particular, time transit ultrasonic flow sensor or meter.

The flow sensor can be programmed or configured to output to a controller 52 an electrical signal related to a velocity or volume of fluid flowing by, proximate to, or through the flow sensor 4; and the controller 52 can be programmed or configured to determine, based on the electrical signal, an actual volume of fluid flowing by, proximate to, or through the flow sensor 4.

The controller 52 can comprise a first processor 54 programmed or configured: with a calibration value related to the distance or length L1, or the distance or length L2, or a type, style, or configuration of the flow diversion or the flow obstruction in the first pipe, or a type, style, or configuration of the flow diversion or the flow obstruction in the second pipe, or some combination thereof; and to determine, based on the electrical signal and the calibration value, a second electrical signal related to an actual velocity or volume of the fluid flowing by, proximate to, or through the flow sensor, wherein the electrical signal and the second electrical signal are different or can include different data modulated thereon.

The controller 52 can also comprise a second processor 58 that can be programmed or configured to determine, based on the second electrical signal, the actual volume of fluid flowing by, proximate to, or through the flow sensor 4. The second processor 58 can be programmed or configured to control the open and closed state of a fluid valve based on the actual volume of fluid determined by the second processor 58 to be flowing by, proximate to, or through the flow sensor 4.

The electrical signal can include data modulated thereon related (inaccurately) to the velocity or volume of the fluid flowing by, proximate to, or through the flow sensor. The second electrical signal can include corrected data modulated thereon related to the actual velocity or volume of fluid flowing by, proximate to, or through the flow sensor. The second processor 58 can programmed or configured to control the open and closed state of a fluid valve based on the corrected data. The data modulated on the electrical signal may be inaccurate for the actual volume of fluid flowing by, proximate to, or through the flow sensor.

In some non-limiting embodiments or examples, the controller 52 can be programmed or configured with an algorithm programmed or preset with a calibration value related to the distance or length L1, or the distance or length L2, or a type, style, or configuration of the first flow diversion or the first flow obstruction (if provided), or a type, style, or configuration of the second flow diversion or the second flow obstruction (if provided), or some combination thereof. The controller can determine, based on said programmed calibration value, the volume of fluid flowing by, proximate to, or through the flow sensor.

Also disclosed herein, in some non-limiting embodiments or examples, e.g., as shown generically in FIG. 1, is a flow system 2 that includes a flow sensor 4, a first pipe 6 configured to transport fluid from an upstream fluid source 10 to the flow sensor 4, and a second pipe 8 configured to transport fluid from the flow sensor 4 to a downstream fluid distributor 12. Proximate the flow sensor 4, the first pipe 6 has a first interior diameter D1 and the second pipe 8 has a second interior diameter D2. A flow diversion 18*a* or a flow obstruction 18*b* is positioned between the flow sensor 4 and the upstream fluid source 10 a distance or length L1 from the flow sensor 4, e.g., inlet 14 of flow sensor 4, that is less than ten times the first interior diameter D1 of the first pipe 6. Also or alternatively, a flow diversion 20*a* or a flow obstruction 20*b* is positioned between the flow sensor 4 and the downstream fluid distributor 12 a distance or length L2 from the flow sensor 4, e.g., outlet 16 of flow sensor 4, that is less than five times the second interior diameter D2 of the second pipe 8. The first interior diameter D1 and the second interior diameter D2 can be the same or different.

The flow sensor 4 can be programmed or configured to output to a controller 52 an electrical signal related (inaccurately) to a velocity or volume of fluid flowing by, proximate to, or through the flow sensor 4. The controller 52 can programmed or configured to determine, based on the electrical signal, an actual volume of fluid flowing by, proximate to, or through the flow sensor 4.

The controller 52 can comprise a first processor 54 programmed or configured: with a calibration value related to the distance or length L1, or the distance or length L2, or a type, style, or configuration of the flow diversion or the flow obstruction in the first pipe, or a type, style, or configuration of the flow diversion or the flow obstruction in the second pipe, or some combination thereof; and to determine, based on the electrical signal and the calibration value, a second electrical signal related to an actual velocity or volume of the fluid flowing by, proximate to, or through the flow sensor. The electrical signal and the second electrical signal are different or can include different data modulated thereon.

The controller 52 can also comprise a second processor 58 programmed or configured to determine, based on the second electrical signal, the actual volume of fluid flowing by, proximate to, or through the flow sensor 4.

The second processor 58 can be programmed or configured to control the open and closed state of a fluid valve based on the actual volume of fluid determined by the second processor 58 to be flowing by, proximate to, or through the flow sensor 4.

The electrical signal can include data modulated thereon related (inaccurately) to the velocity or volume of the fluid flowing by, proximate to, or through the flow sensor 4. The second electrical signal can include corrected data modulated thereon related to the actual velocity or volume of fluid flowing by, proximate to, or through the flow sensor. The second processor 58 can be programmed or configured to control the open and closed state of a fluid valve based on the corrected data. The data on the electrical signal may be inaccurate for the actual volume of fluid flowing by, proximate to, or through the flow sensor.

The controller 52 can be programmed or configured with an algorithm that includes a variable programmed with a calibration value related to the distance or length L1, or the distance or length L2, or a type, style, or configuration of the first flow diversion or the first flow obstruction, or a type, style, or configuration of the second flow diversion or the second flow obstruction, or some combination thereof. The controller can determine, based on said programmed calibration value, the volume of fluid flowing by, proximate to, or through the flow sensor.

The type, style, or configuration of at least one of the first flow diversion (18*a*) and the second flow diversion (20*a*) can be a bend 22 (FIG. 2) or a junction 24 (FIG. 3). The bend 22 can be a right angle or another angle <180°. The junction 24 can be T-shaped or any other shape having three or more ports (inlet(s) and outlet(s)).

The type, style, or configuration of at least one of the first flow obstruction (18*b*) and the second flow obstruction (20*b*) can be a valve 25 (FIG. 5) or another pipe 28 (FIG. 4) having an interior diameter D3 that is less than the respective first interior diameter D1 of the first pipe and the second interior diameter D2 of the second pipe.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that can be within the spirit and scope of the appended claims. For example, it is to be understood that the present invention contemplates that, to the extent possible, one or more features of any embodiment can be combined with one or more features of any other embodiment.

The invention claimed is:

1. A flow system comprising:
a flow sensor connected via a plurality of fluid delivery pipes between a fluid source and a fluid distributor, the plurality of fluid delivery pipes including a first pipe connected between the fluid source and an inlet to the flow sensor and a second pipe connected between an outlet of the flow sensor and the fluid distributor, wherein:

proximate the inlet of the flow sensor, the first pipe has a first interior diameter; and proximate the outlet of the flow sensor, the second pipe has a second interior diameter; and at least one of the following:

a distance or length L1 between an inlet of the flow sensor and a flow diversion or a flow obstruction in the fluid path of the first pipe leading to the inlet of the flow sensor is less than ten times the first interior diameter; and a distance or length L2 between the outlet of the flow sensor and a flow diversion or a flow obstruction in the fluid path of the second pipe exiting the flow sensor is less than five times the second interior diameter, wherein:

the flow sensor is programmed or configured to output to a controller an electrical signal related to a velocity or volume of fluid flowing by, proximate to, or through the flow sensor;

the controller is programmed or configured to determine, based on the electrical signal, an actual volume of fluid flowing by, proximate to, or through the flow sensor; and the controller comprises a first processor programmed or configured:

with a calibration value related to the distance or length L1, or the distance or length L2, or a type, style, or configuration of the flow diversion or the flow obstruction in the first pipe, or a type, style, or configuration of the flow diversion or the flow obstruction in the second pipe, or some combination thereof; and to determine, based on the electrical signal and the calibration value, a second electrical signal related to an actual velocity or volume of the fluid flowing by, proximate to, or through the flow sensor, wherein the electrical signal and the second electrical signal are different or have different data modulated thereon.

2. The flow system of claim 1, wherein the flow diversion of at least one of the first pipe and the second pipe includes:

a bend in said pipe; or a junction of at least portions of said pipe.

3. The flow system of claim 1, wherein the flow obstruction in the fluid path of at least one of the first pipe and the second pipe is a fluid valve or another pipe having an interior diameter that is less than the respective first interior diameter and second interior diameter.

4. The flow system of claim 1, wherein the flow obstruction in the fluid path of the second pipe is a fluid valve having an inlet connected to the second pipe opposite the flow sensor and an outlet connected to the fluid distributor via a third pipe.

5. The flow system of claim 1, wherein the flow sensor is an ultrasonic flow sensor.

6. The flow system of claim 5, wherein the ultrasonic flow sensor is a time transit flow meter.

7. The flow system of claim 1, wherein the controller comprises a second processor programmed or configured to determine, based on the second electrical signal, the actual volume of fluid flowing by, proximate to, or through the flow sensor.

8. The flow system of claim 7, wherein the second processor is programmed or configured to control the open and closed state of a fluid valve based on the actual volume of fluid determined by the second processor to be flowing by, proximate to, or through the flow sensor.

9. The flow system of claim 7, wherein:

the electrical signal includes data modulated thereon related to the velocity or volume of the fluid flowing by, proximate to, or through the flow sensor;

the second electrical signal includes corrected data modulated thereon related to the actual velocity or volume of fluid flowing by, proximate to, or through the flow sensor; and the second processor is programmed or configured to control the open and closed state of a fluid valve based on the corrected data, wherein the data modulated on the electrical signal is inaccurate for the actual volume of fluid flowing by, proximate to, or through the flow sensor.

10. A flow system comprising:

a flow sensor connected via a plurality of fluid delivery pipes between a fluid source and a fluid distributor, the plurality of fluid delivery pipes including a first pipe connected between the fluid source and an inlet to the flow sensor and a second pipe connected between an outlet of the flow sensor and the fluid distributor, wherein:

proximate the inlet of the flow sensor, the first pipe has a first interior diameter; and proximate the outlet of the flow sensor, the second pipe has a second interior diameter; and at least one of the following:

a distance or length L1 between an inlet of the flow sensor and a flow diversion in the fluid path of the first pipe leading to the inlet of the flow sensor is less than ten times the first interior diameter; and a distance or length L2 between the outlet of the flow sensor and a flow diversion in the fluid path of the second pipe exiting the flow sensor is less than five times the second interior diameter, wherein:

the flow diversion in the fluid path of the second pipe includes a junction between an inlet of the second pipe that is connected to an outlet of the flow sensor, a first outlet connected to an inlet of a fluid valve, and a second outlet; and a third pipe includes a flow diversion in the fluid path of the third pipe in the form of a junction between a first inlet of the third pipe connected to an outlet of the fluid valve, a first outlet connected to the fluid distributor, and a second inlet;

a shunt pipe is connected in parallel with the fluid valve between the second outlet of the second pipe and the second inlet of the third pipe; and a second fluid valve and a hydrogenerator are mounted to the shunt pipe such that fluid flowing from the second pipe to the third pipe via the shunt pipe flows through the second fluid valve and the hydrogenerator, the hydrogenerator generating electrical power in response to the fluid flowing through the hydrogenerator.

11. A flow system comprising:

a flow sensor;

a first pipe configured to transport fluid from an upstream fluid source to the flow sensor, and a second pipe configured to transport fluid from the flow sensor to a downstream fluid distributor, wherein:

proximate the flow sensor, the first pipe has a first interior diameter and the second pipe has a second interior diameter, and at least one of the following:
a first flow diversion or a first flow obstruction positioned between the flow sensor and the upstream fluid source a distance or length L1 from the flow sensor that is less than ten times the first interior diameter of the first pipe; and
a second flow diversion or a second flow obstruction positioned between the flow sensor and the downstream fluid distributor a distance or length L2 from the flow sensor that is less than five times the second interior diameter of the second pipe, wherein:

the flow sensor is programmed or configured to output to a controller an electrical signal related to a velocity or volume of fluid flowing by, proximate to, or through the flow sensor;

the controller is programmed or configured to determine, based on the electrical signal, an actual volume of fluid flowing by, proximate to, or through the flow sensor;

the controller comprises a first processor programmed or configured:
with a calibration value related to the distance or length L1, or the distance or length L2, or a type, style, or configuration of the flow diversion or the flow obstruction in the first pipe, or a type, style, or configuration of the flow diversion or the flow obstruction in the second pipe, or some combination thereof; and
to determine, based on the electrical signal and the calibration value, a second electrical signal related to an actual velocity or volume of the fluid flowing by, proximate to, or through the flow sensor, wherein the electrical signal and the second electrical signal are different.

12. The flow system of claim 11, wherein the controller comprises a second processor programmed or configured to determine, based on the second electrical signal, the actual volume of fluid flowing by, proximate to, or through the flow sensor.

13. The flow system of claim 12, wherein the second processor is programmed or configured to control the open and closed state of a fluid valve based on the actual volume of fluid determined by the second processor to be flowing by, proximate to, or through the flow sensor.

14. The flow system of claim 12, wherein:
the electrical signal includes data modulated thereon related to the velocity or volume of the fluid flowing by, proximate to, or through the flow sensor;
the second electrical signal includes corrected data modulated thereon related to the actual velocity or volume of fluid flowing by, proximate to, or through the flow sensor; and
the second processor is programmed or configured to control the open and closed state of a fluid valve based on the corrected data, wherein the data modulated on the electrical signal is inaccurate for the actual volume of fluid flowing by, proximate to, or through the flow sensor.

15. The flow system of claim 11, wherein the type, style, or configuration of at least one of the first flow diversion and the second flow diversion is a bend or a junction.

16. The flow system of claim 11, wherein the type, style, or configuration of at least one of the first flow obstruction and the second flow obstruction is a fluid valve or another pipe having an interior diameter that is less than the respective first interior diameter of the first pipe and the second interior diameter of the second pipe.

* * * * *

UNITED STATES PATENT AND TRADEMARK OFFICE
CERTIFICATE OF CORRECTION

| | |
|---|---|
| PATENT NO. | : 11,307,068 B2 |
| APPLICATION NO. | : 16/660971 |
| DATED | : April 19, 2022 |
| INVENTOR(S) | : Larry C. Sarver |

It is certified that error appears in the above-identified patent and that said Letters Patent is hereby corrected as shown below:

In the Claims

Column 18, Line 65, Claim 11, delete "sensor," and insert -- sensor; --

Column 19, Line 3, Claim 11, delete "diameter," and insert -- diameter; --

Signed and Sealed this
Nineteenth Day of July, 2022

Katherine Kelly Vidal
*Director of the United States Patent and Trademark Office*